US009559910B2

(12) United States Patent
He et al.

(10) Patent No.: US 9,559,910 B2
(45) Date of Patent: Jan. 31, 2017

(54) LOCATING VIRTUAL MACHINE(S) WITHIN VIRTUAL NETWORKS

(71) Applicant: INTERNATIONAL BUSINESS MACHINES CORPORATION, Armonk, NY (US)

(72) Inventors: Jing He, Wuxi (CN); Jing Lu, Wuxi (CN); Jin Ming Shang, Wuxi (CN); Jun Yao, Wuxi (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/725,025

(22) Filed: May 29, 2015

(65) Prior Publication Data
US 2016/0352579 A1 Dec. 1, 2016

(51) Int. Cl.
G06F 9/45 (2006.01)
H04L 12/24 (2006.01)
H04L 29/12 (2006.01)
G06F 9/455 (2006.01)

(52) U.S. Cl.
CPC ............ *H04L 41/12* (2013.01); *G06F 9/45558* (2013.01); *H04L 61/6022* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 8,861,345 | B2 | 10/2014 | Hares et al. |
| 2012/0014386 | A1* | 1/2012 | Xiong ............... H04L 29/12028 370/392 |
| 2013/0315246 | A1 | 11/2013 | Zhang et al. |
| 2014/0115584 | A1 | 4/2014 | Mudigonda et al. |
| 2014/0126418 | A1 | 5/2014 | Brendel et al. |

(Continued)

OTHER PUBLICATIONS

Microsoft, "How to Disable the Gratuitous ARP Function, https://web.archive.org/web/20140310072714/http://support.microsoft.com/kb/219374/en-US#appliesto", Mar. 14, 2014.*

(Continued)

*Primary Examiner* — Sisley Kim
(74) *Attorney, Agent, or Firm* — Isaac J. Gooshaw, Esq.; George S. Blasiak, Esq.; Heslin Rothenberg Farley & Mesiti P.C.

(57) ABSTRACT

Methods, computer program products, and systems are presented. The methods include, for instance: locating, by one or more processor, at least one virtual machine within a virtual network, wherein gratuitous address resolution functionality of the at least one virtual machine is inactive; and providing, by the one or more processor, location information of the at least one virtual machine. In one embodiment, the locating comprises: receiving an IP address of the at least one virtual machine; and selecting a virtual machine hosting network device from a computing network node table, where the computing network node table comprises at least one network connection record of the silent virtual machine network device hosting a silent virtual machine having a known MAC address and an unknown IP address; and querying the silent virtual machine network device for a MAC address corresponding to the IP address of the at least one virtual machine.

17 Claims, 9 Drawing Sheets

(56) References Cited

U.S. PATENT DOCUMENTS

2014/0233569 A1  8/2014  Yong et al.

OTHER PUBLICATIONS

Problem Statement: Overlays for Network Virtualization, Narten, et al., Oct. 2014.
Mell et al., "The NIST Definition of Cloud Computing", National Institute of Standards and Technology, U.S. Department of Commerce, NIST Special Publication 800-145, Sep. 2011, 7 pages.

* cited by examiner

LOCATING VIRTUAL MACHINE(S) WITHIN VIRTUAL NETWORKS

TECHNICAL FIELD

The present disclosure relates to virtualization technologies, including virtual networking and virtual computing, and more particularly to locating virtual machines within virtual networks.

BACKGROUND

As demand continues for high capacity distributed data centers, virtualization technologies, including the use of virtual machines and software defined networking, have been leveraged to provide increased scalability and enhanced performance of network and computer resources. For instance, virtualization of resources, such as network, computer, and storage resources, allows abstraction of physical resources into logical representations, providing for flexibility in the provisioning and management of services and hardware infrastructure. In addition, virtualization can enable the deployment of multi-tenant data center infrastructures, in which multiple independent customer domains can be hosted using a single set of physical resources. In addition, virtualization can allow for virtual machines, such as virtual servers or clients, to be deployed with variable levels of computer resources, which can be increased or decreased as needed. Further, virtualization can allow for virtual machines to be located anywhere within a virtual network, and to have multiple different locations over time, due to, for example, migration.

However, some of the features that make virtualization technologies attractive can lead to problems. Underlying physical resources, such as real computers and network devices, can be harder to manage and track when services and software are virtualized because the physical locations are decoupled from the virtual locations. For example, larger amounts of network bandwidth and processing resources can be consumed due to a plurality of virtual machines sending and/or receiving data over the virtual networks.

SUMMARY

Shortcomings of the prior art are overcome and additional advantages are provided through the provision, in one aspect, of a method. The method includes locating, by one or more processor, at least one virtual machine within a virtual network. The method includes providing, by the one or more processor, location information of the at least one virtual machine.

In another aspect, a computer program product is provided. The computer program product includes: a computer readable storage medium readable by one or more processor and storing instructions for execution by the one or more processor for performing a method. The method includes locating, by one or more processor, at least one virtual machine within a virtual network. The method includes providing, by the one or more processor, location information of the at least one virtual machine.

In a further aspect, a system is provided. The system includes: a memory; one or more processor in communication with the memory; and program instructions executable by the one or more processor via the memory to perform a method. The method includes locating, by one or more processor, at least one virtual machine within a virtual network. The method includes providing, by the one or more processor, location information of the at least one virtual machine.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present disclosure are particularly pointed out and distinctly claimed as examples in the claims at the conclusion of the specification. The foregoing and other objects, features, and advantages of the present disclosure are apparent from the following detailed description taken in conjunction with the accompanying drawings in which:

DETAILED DESCRIPTION

Figure 1:
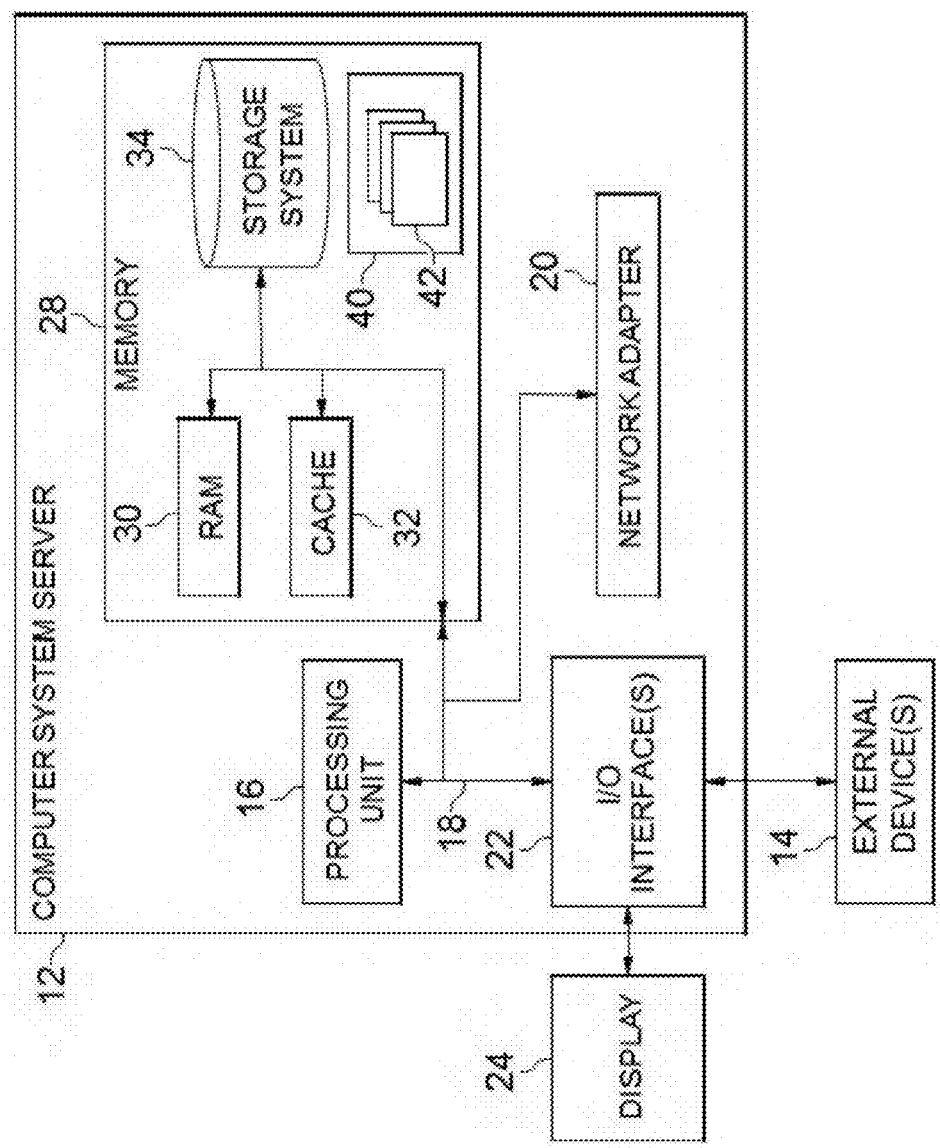
FIG. 1 depicts a cloud computing node, according to an embodiment of the present invention.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer programs, computer systems, network devices, and network policy devices for locating virtual machines within virtual networks. In a virtual network, hundreds, thousands or millions of virtual machines can be deployed. These virtual machines can generate large volumes of network traffic, such as address resolution protocol (ARP) messages. In one example, silent virtual machines, may not produce such excess network traffic because they can have inactive gratuitous address resolution functionality. However, such silent virtual machines can then be difficult to locate, necessitating large volumes of location requests by network peers using standard transport control protocol/internet protocol (TCP/IP) networking technologies to repeatedly locate the silent virtual machines.

As used herein, gratuitous address resolution messages, such as gratuitous ARP messages, are messages that are not required according to an address resolution protocol or scheme, such as ARP. In some cases, gratuitous address resolution messages have been used to solve a host of practical implementation problems in computer networking. For instance, gratuitous address resolution messages, which broadcast a machine's media access control (MAC) address and internet protocol (IP) address, can be used to provide early detection of IP address conflicts. In addition, gratuitous address resolution messages can be used to ensure that routers and/or switches have updated forwarding tables. Further, gratuitous address resolution protocol messages sent during interface activation can be used to allow forwarding tables of other local hosts to be preloaded.

However, as software defined networking, including virtual networking, has proceeded, making use of underlying networking technologies, certain previously innocuous features, such as gratuitous use of address resolution messages, can lead to significant burdens on network devices and can waste network bandwidth resources. Therefore, gratuitous address resolution functionality can be inactivated for one or more virtual machines operating in a virtual network. In one example, gratuitous address resolution functionality can be inactivated through a user interface to a virtual machine, e.g., by setting a value of a registry entry or by using a command line interface. In another example, gratuitous address resolution functionality can be inactivated programmatically. In a further example, gratuitous address resolution functionality can be active for a first time period, and inactive for a second time period.

By way of explanation, silent virtual machines can include endpoints having IP addresses that are not registered with a central authority, such as a central connectivity service. For example, certain systems, such as guest operation systems, do not send gratuitous ARP messages during activation of the IP address or when a virtual machine moves from one computing network node to another computing network node.

However, when virtual machines communicate in an overlay network, such as a virtual network, it can be important to have location information of the virtual machines. In one example, storing the location information in a central connectivity service can allow for centralized access. In such a case, if a virtual switch receives an ARP request, e.g., endpoint request, and does not have the required information, the virtual switch can query the central connectivity service for the location information. In another example, if the information is not registered on a central connectivity service, all computing nodes can be queried for the location information.

By way of example, in an overlay network, tens of thousands or more endpoints (such as virtual machines) can exist, and such processes for obtaining location information, for example of silent virtual machines, can cause substantial burden on network and computer resources. In some environments, not all computing nodes will host silent virtual machines, and this fact can be leveraged to reduce the amount of querying required in locating silent virtual machines. In another example, a central connectivity service can acts as a cluster to provide virtual machine connectivity services in an overlay network. In a further example, virtual switches can initiate requests for location information, and the central connectivity service can respond to such requests by providing location information.

Advantageously, the present disclosure provides technological solutions to improve the functioning of software defined networking, for example, by reducing the bandwidth and processing resources required in the management and provisioning of virtual machines. For instance, techniques for locating silent virtual machines within virtual networks allow for configuring such virtual machines to be silent, and thereby reduce network bandwidth, and at the same time alleviate the network bandwidth and computing resources used to locate such silent virtual machines. In addition, centralizing knowledge of silent virtual machine location information can allow for faster access on the virtual network. Also, a virtual machine registry can list previously located virtual machines to reduce redundant location query processing. Further, centralized querying of networks for virtual machines can allow access to location information to multiple network peers. In addition, maintaining a computing network node table can allow a centralized connectivity service to efficiently query for silent virtual machines.

Reference is made below to the drawings, which are not drawn to scale for ease of understanding, wherein the same reference numbers used throughout different figures designate the same or similar components.

FIGS. 1-4 depict various aspects of computing, including cloud computing, according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
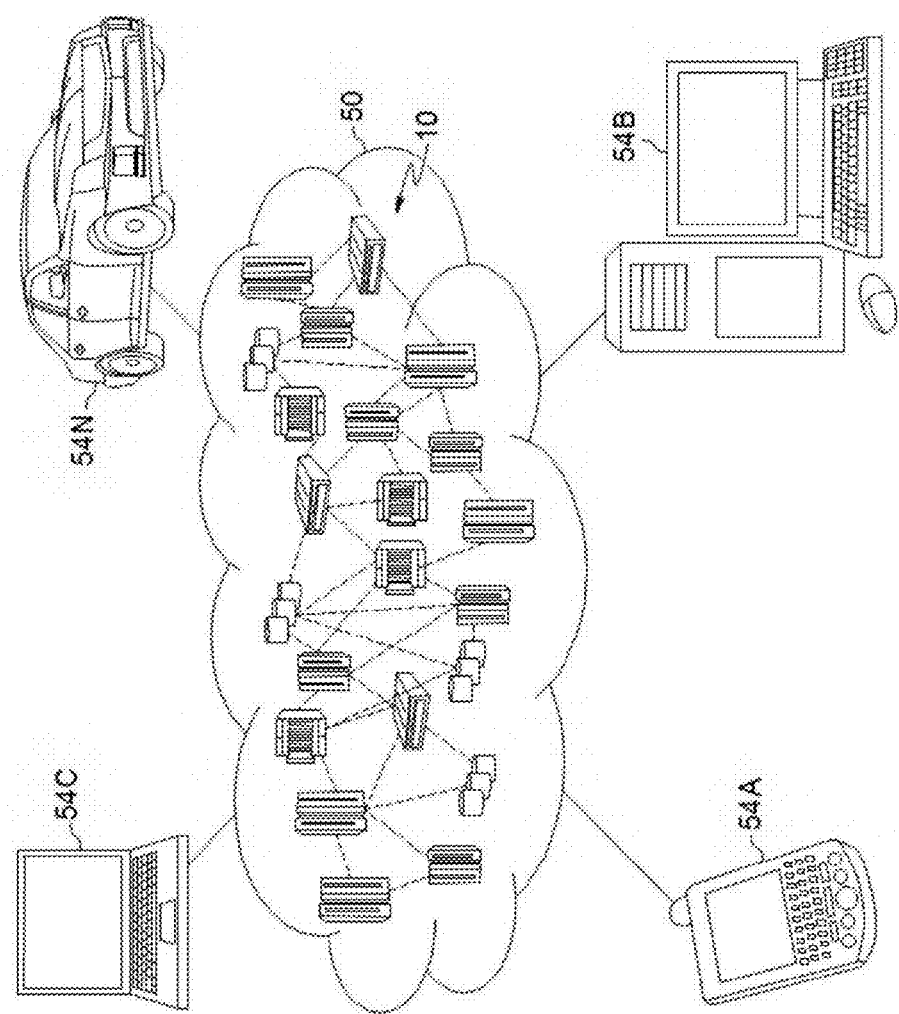
FIG. 2 depicts a cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
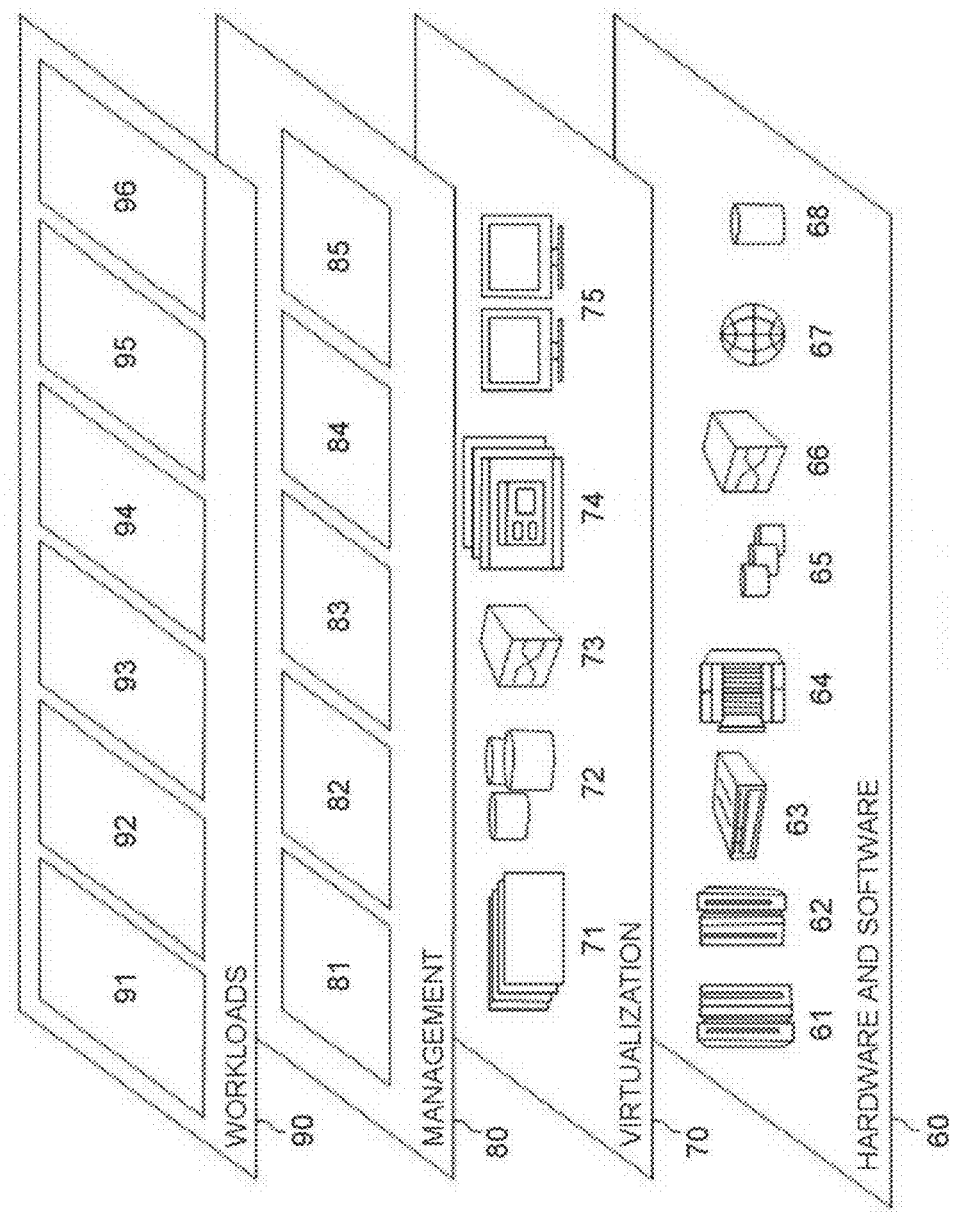
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and locating virtual machines within virtual networks 96 as described herein.

Figure 4:
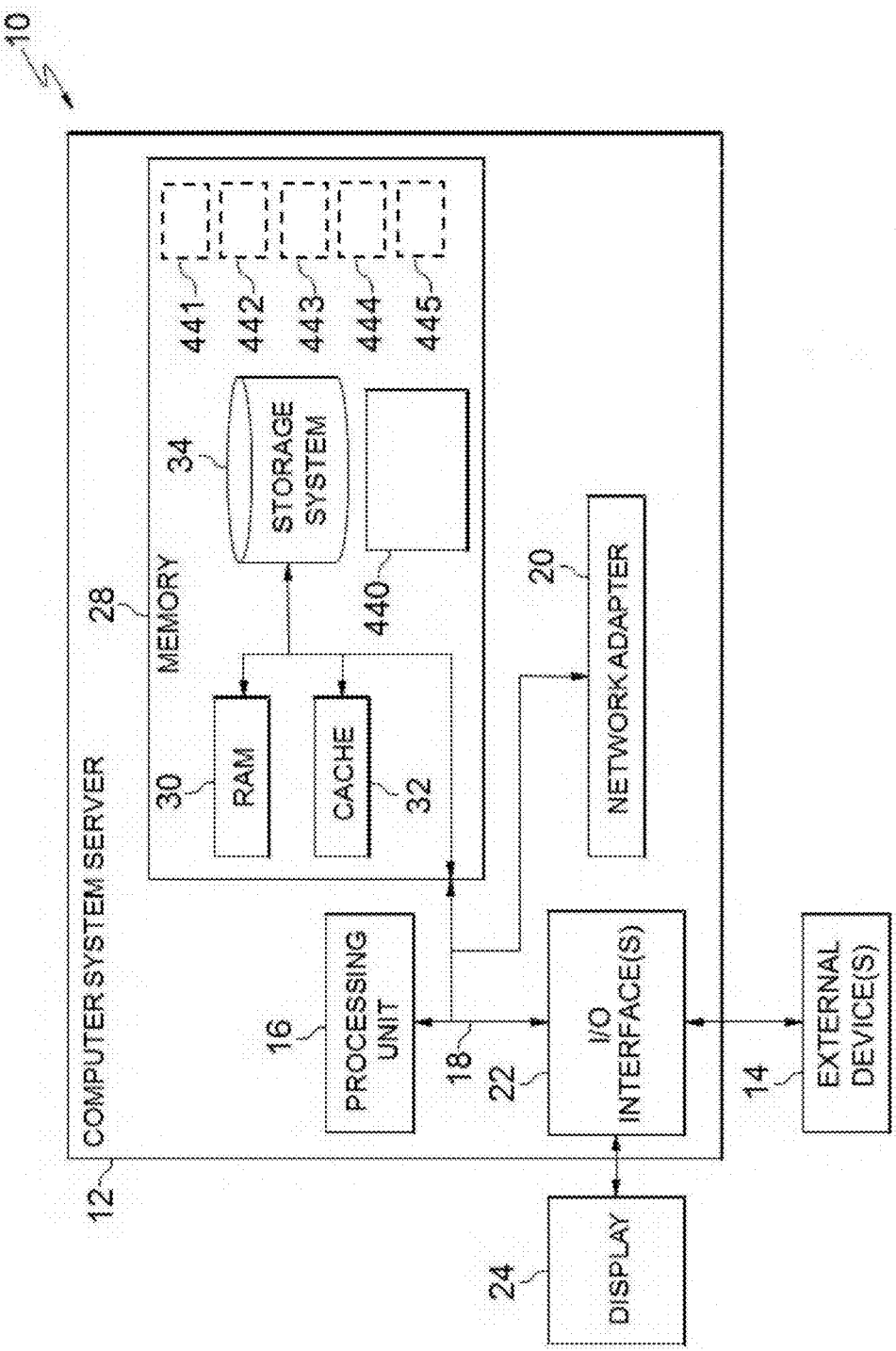
FIG. 4 depicts a hardware overview of a computing node, in accordance with one or more aspects set forth herein.

FIG. 4 depicts a hardware overview of a computing node 10, which may be a cloud computing node, a network device 120, 120-A, 120-B, 120-C (FIG. 5), a network connectivity device 125 (FIG. 5), and/or a computing node 130-A, 130-B, 130-C (FIG. 5), in accordance with one or more aspects set forth herein.

Figure 5:
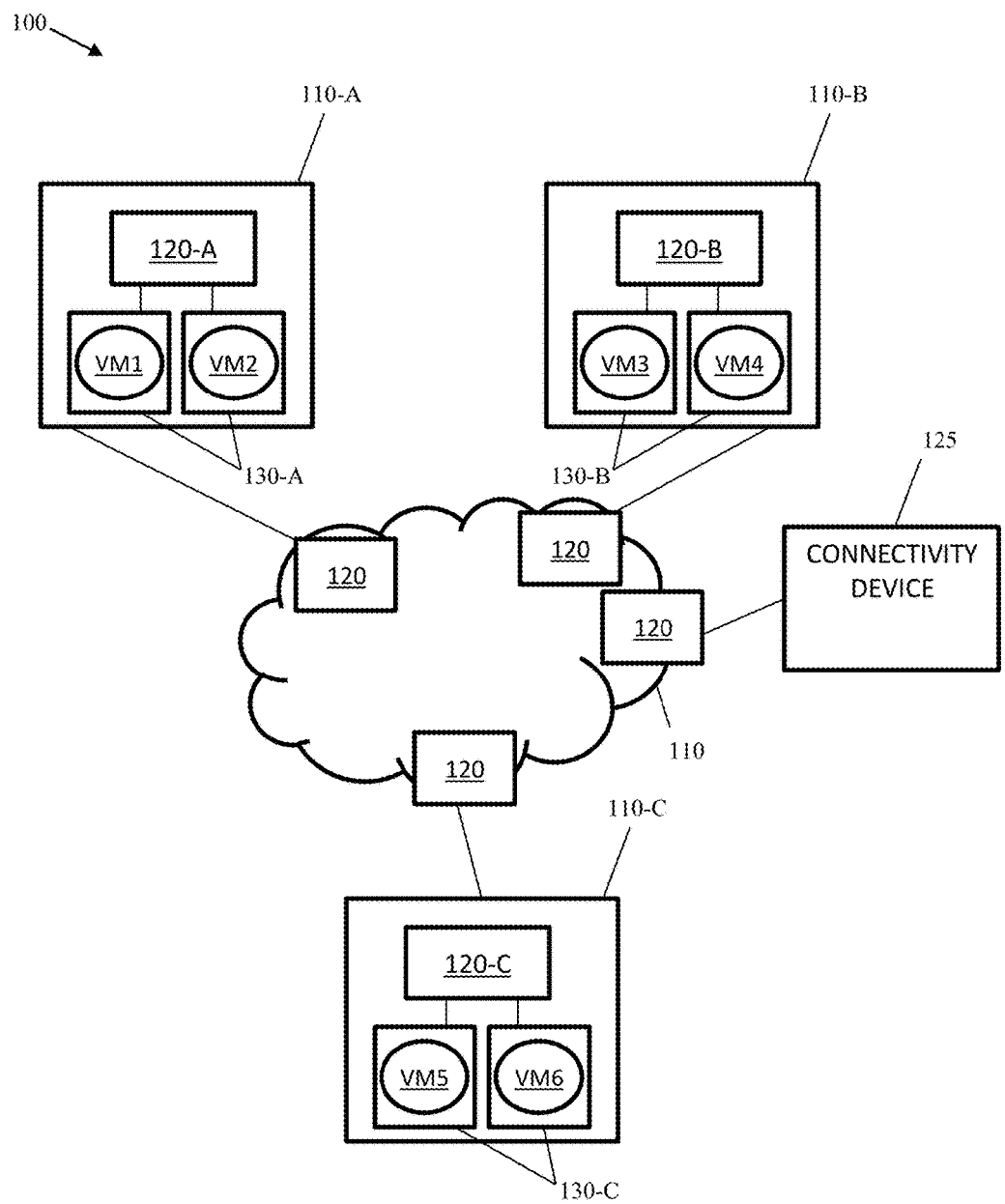
FIG. 5 is an exemplary block diagram of a system, in accordance with one or more aspects set forth herein.

Program/utility 40 as set forth in FIG. 1 can include one or more program 440 as set forth in FIG. 4, and program/utility 40 as set forth in FIG. 5 can optionally include some or all of one or more program 441, 442, 443, 444, 445.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally some or all of one or more program 441, 442, 443, 444, 445) generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 5 is an exemplary block diagram of a system 100, in accordance with one or more aspects set forth herein. In the embodiment of FIG. 5, system 100 includes numerous networks 110, which may be physical networks, virtual networks, or computing network nodes having networked elements such as computers and servers. A physical network can be, for example, a physical telecommunications network connecting numerous computer nodes or systems, such as computer servers and computer clients. By contrast, a virtual network can, for example, combine numerous physical networks or parts thereof into a logical virtual network. In another example, numerous virtual networks can be defined over a single physical network.

In one embodiment, a network, e.g., a network 110, 110-A, 110-B, 110-C, connects to one or more network devices, e.g., network devices 120, 120-A, 120-B, 120-C, and one or more computing nodes, e.g., computing nodes 130-A, 130-B, 130-C. For example, network device 120 can be a network edge device, such as a network switch or network router, and can operate at one or more network protocol layers, such as layer 2 (L2), layer 3 (L3), or layers 4-7 (L4-L7). In another example, network device 120 can combine the features of network switches and network routers. In general, each of network device 120, 120-A, 120-B, 120-C and computing node 130-A, 130-B, 130-C can be or include a computing node 10 (FIG. 4), details of which are described below.

In one embodiment, a network connectivity device 125 can be included, so that control plane information between network devices 120 may be communicated. In one example, network connectivity device 125 can be one of the network devices 120 provisioned with software to perform the functions noted below with respect to network connectivity device 125. In the embodiment of FIG. 5, network connectivity device 125 is shown as a separate device.

In one embodiment, computing nodes 130-A, 130-B, 130-C can each have one or more virtual machines, e.g., virtual machines VM1, VM2, VM3, VM4, VM5, VM6. For example, a virtual machine VM1 is a software computer that can run an operating system and applications, and can have access to virtual devices. In addition, a virtual machine can exist on more than one physical machine, and numerous virtual machines can exist one the same set of physical machines. From the standpoint of a client, such as another virtual machine or physical machine, communication and interaction with a virtual machine proceeds just as with physical machines.

Figure 6:
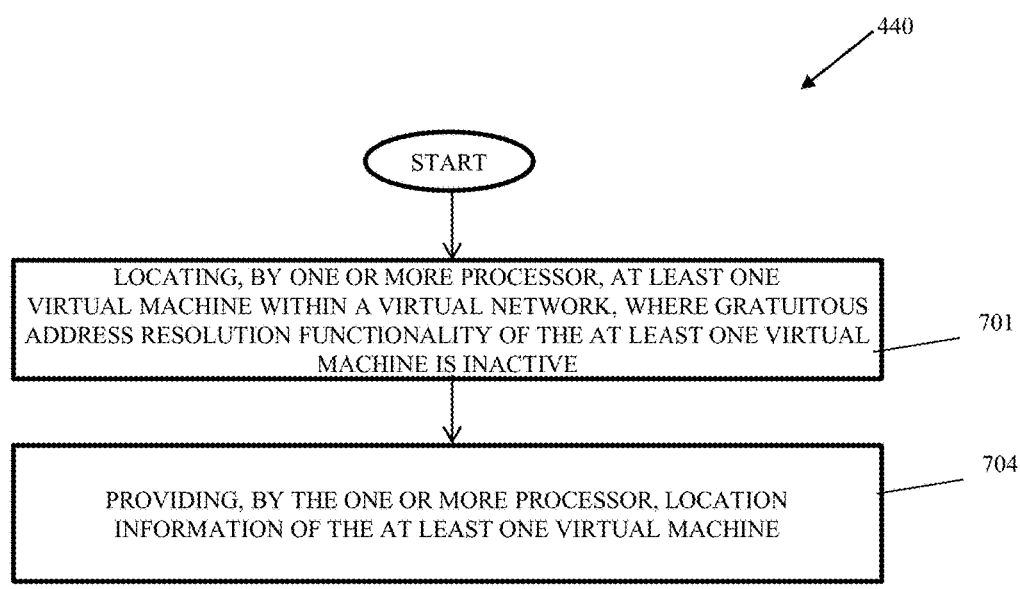
FIG. 6 depicts embodiments of processes for updating networks, in accordance with one or more aspects set forth herein.

FIG. 6 depicts embodiments of processes for updating networks, in accordance with one or more aspects set forth herein. By way of example, the processes described with respect to FIG. 6 can be performed using one or more program 440 on one or more network connectivity device 125 (FIG. 5), as detailed with respect to FIG. 4.

In the embodiment of FIG. 6, one or more program 440 at block 701 locates at least one virtual machine within a virtual network, where gratuitous address resolution functionality of the at least one virtual machine is inactive; and one or more program 440 at block 704 provides location information of the at least one virtual machine.

In one embodiment, one or more program 440 at block 701 receives an IP address of the at least one virtual machine and selects a silent virtual machine network device from a computing network node table, where the computing network node table comprises at least one network connection record of the silent virtual machine network device hosting a silent virtual machine having a known MAC address and an unknown IP address; and one or more program 440 at block 701 queries the silent virtual machine network device for a MAC address corresponding to the IP address of the at least one virtual machine.

In one embodiment, the known MAC address of the silent virtual machine and the MAC address of the at least one virtual machine are the same MAC address, and the silent virtual machine and the at least one virtual machine are the same virtual machine.

In one embodiment, the known MAC address of the silent virtual machine and the MAC address of the at least one virtual machine are different MAC addresses, and the silent virtual machine and the at least one virtual machine are different virtual machines.

In one embodiment, one or more program 440 at block 701 ends querying after a pre-determined timeout interval. For instance, the silent virtual machine may not be found, necessitating ending the query. In one embodiment, one or more program 440 at block 701 selects a silent virtual machine network device from the computing network node table, where the computing network node table does not indicate the silent virtual machine network device is connected to any silent virtual machine; and one or more program 440 at block 701 queries the silent virtual machine network device for a MAC address corresponding to the IP address of the at least one virtual machine.

In one embodiment, one or more program 440 at block 701 receives, from the at least one silent virtual machine network device, the MAC address corresponding to the IP address of the at least one virtual machine.

In one embodiment, one or more program 440 at block 701 receives an IP address of the at least one virtual machine and finds a MAC address corresponding to the IP address of the at least one virtual machine.

In one embodiment, one or more program 440 at block 704 registers the found MAC address corresponding to the received IP address of the at least one virtual machine in a virtual machine registry.

In one embodiment, one or more program 440 at block 701 checks a virtual machine registry for the MAC address corresponding to the received IP address of the at least one virtual machine.

In one embodiment, one or more program 440 at block 701 uses a layer 3 network address of the at least one virtual machine to locate a network device having a layer 2 network connection to the at least one virtual machine.

In one embodiment, one or more program 440 sets the at least one virtual machine to be a silent virtual machine, so that gratuitous address resolution functionality is inactive.

In one embodiment, one or more program 440 at block 701 checks a virtual machine registry for the location information of the at least one virtual machine. In another embodiment, one or more program 440 at block 704 registers the at least one virtual machine in a virtual machine registry. In a further embodiment, one or more program 440 at block 701 queries at least one network for the at least one virtual machine.

In one embodiment, one or more program 440 at block 704 records the at least one computing network node having a virtual machine in a computing network node table. In another embodiment, one or more program 440 at block 701 selects at least one network from a computing network node table, and queries the at least one network for the at least one virtual machine. In a further embodiment, one or more program 440 at block 701 queries, for a pre-determined timeout interval, at least one network for the at least one virtual machine, and one or more program 440 at block 701 queries at least another network for the at least one virtual machine.

In one embodiment, one or more program 440 at block 701 locates the at least one virtual machine after a migration of the at least one virtual machine from a first location of the virtual network to a second location of the virtual network. In another embodiment, one or more program 440 at block 701 receives virtual machine identification information corresponding to the at least one virtual machine. In a further embodiment, one or more program 440 at block 704 provides the location information corresponding to the virtual machine identification information.

In one embodiment, one or more program 440 at block 701 locates a virtual machine by receiving an IP address of the virtual machine, and then provides a media access control (MAC) address of the virtual machine.

In one embodiment, one or more program 440 at block 701 locates a virtual machine by receiving a layer 3 address, e.g., IP address of the virtual machine, and then provides a layer 2 address, e.g., multiprotocol label switching (MPLS), of the virtual machine.

In one embodiment, one or more program 440 at block 701 locates a virtual machine by simultaneously querying multiple networks known to have at least one silent virtual machine.

In one embodiment, one or more program 440 at block 701 locates a virtual machine by first querying all computing network nodes listed in a computing network node table as having at least one silent virtual machine, and subsequently querying those known networks to locate the virtual machine.

In one embodiment, one or more program 440 at block 701 locates multiple virtual machines by receiving a query including identification information (e.g., IP addresses) for the multiple virtual machines and responding with a set of location information for the multiple virtual machines.

In one embodiment, one or more program 440 at block 704 provides, in response to a query, a forwarding table listing previously identified virtual machines, so that a network device receiving the forwarding table can store a local copy to facilitate efficient location of virtual machines.

In one embodiment, one or more program 440 at block 701 locates a virtual machine that was previously located but is no longer located at its prior location, by invalidating the prior location and again querying at least one network device for the location of the virtual machine. For example, entries in the silent virtual machine registry can be invalidated after a pre-determined aging time, such that the aging time is tuned to optimize a balance between excessive querying for the same information and providing out of date information.

Figure 7A:
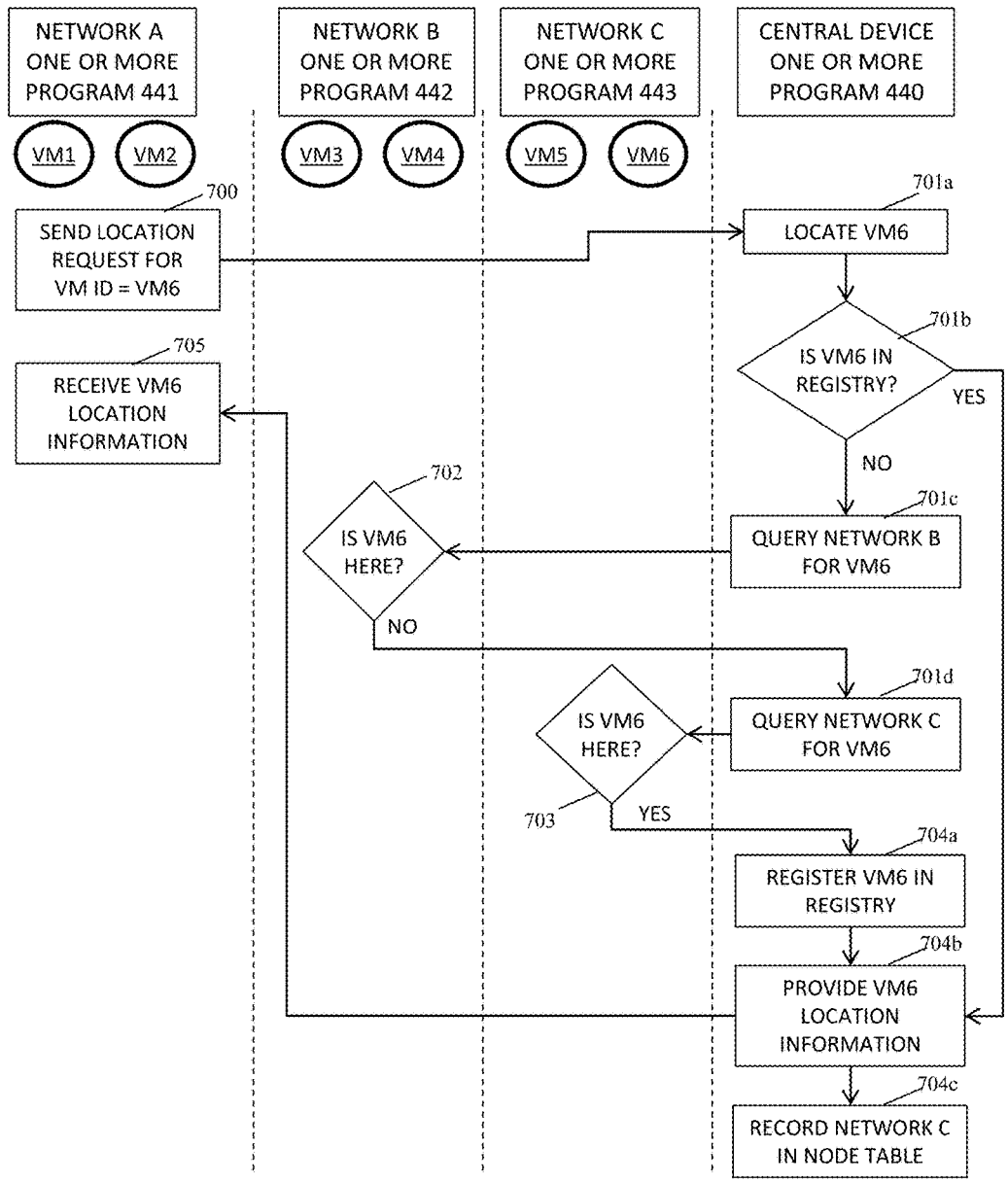
FIGS. 7A-7C are diagrams illustrating further aspects of processes for updating networks, in accordance with one or more aspects set forth herein.
Figure 7B:
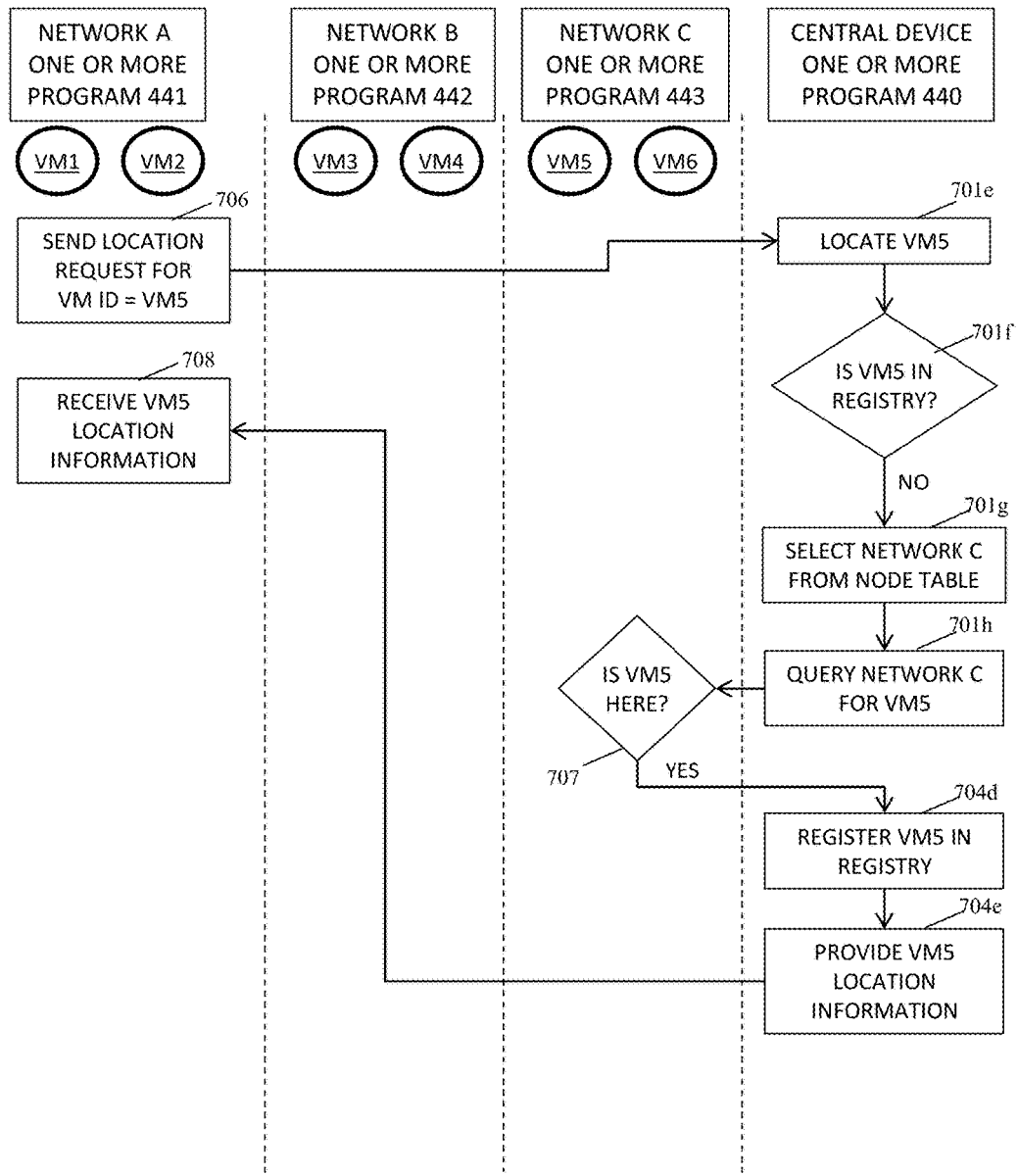
Figure 7C:
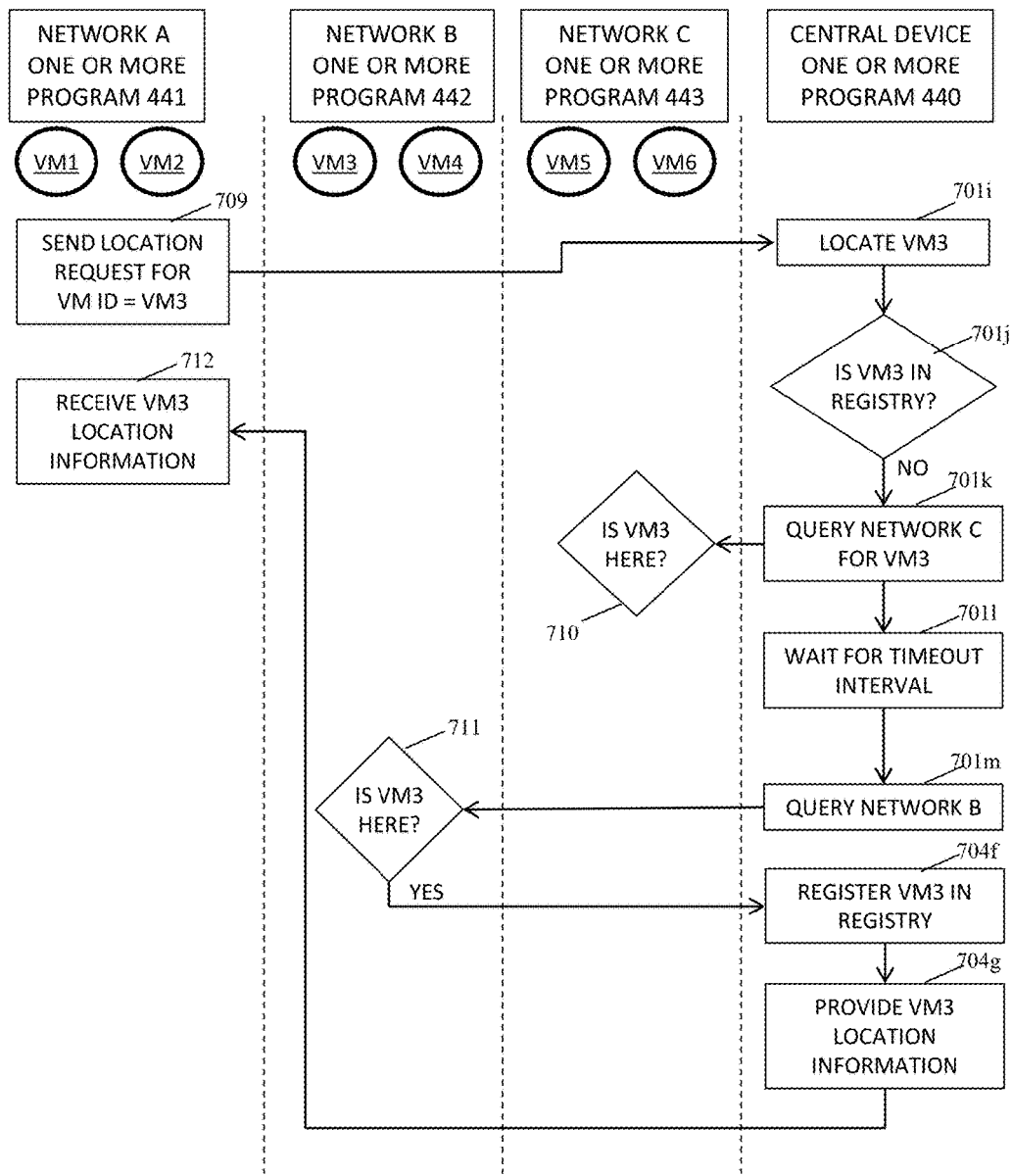

FIGS. 7A-7C are diagrams illustrating further aspects of processes for updating networks, in accordance with one or more aspects set forth herein.

The embodiments of FIGS. 7A-7C may be used to understand certain problems that can arise when managing virtual machines in a virtual networking environment, and explain how the techniques disclosed herein may be used to overcome such problems. In particular, in an effort to reduce network traffic, so-called silent virtual machines can be configured to not send out gratuitous routing messages such as gratuitous ARP messages. In such a case, locating such virtual machines can require sending multiple, repetitive location requests using current TCP/IP methodologies.

Advantageously, the present disclosure allows for making use of the bandwidth reduction offered by silent virtual machines, but at the same time overcomes the problem of locating the silent virtual machines during operation of the network. In one embodiment, a central connectivity service can be deployed to efficiently track the locations of silent virtual machines and the network computing nodes that are known to have silent virtual machines. For example, the central connectivity service can be deployed on a centralized device having access to virtual network control plane information. In one specific example, the central connectivity service can be co-located as a virtual machine running on a network device already deployed in the system.

By way of explanation, in FIGS. 7A-7C, processes are illustrated from the point of view of a network connectivity device one or more program 440, a network A one or more program 441, a network B one or more program 442, and a network C one or more program 443. In one embodiment, one or more program 440 runs on one or more processor 16 (FIG. 4) of a network connectivity device 125 (FIG. 5). In one embodiment, one or more program 441 runs on one or more processor 16 (FIG. 4) of a network device 120-A (FIG. 5). In one embodiment, one or more program 442 runs on one or more processor 16 (FIG. 4) of a network device 120-B (FIG. 5). In one embodiment, one or more program 443 runs on one or more processor 16 (FIG. 4) of a network device 120-C (FIG. 5). In other embodiments, various programs can run on a different complement of devices. For example, in one embodiment, one or more program 440 and one or more program 441 can both run on network device 120-a (FIG. 5), which can simultaneously service network A and provide network connectivity device functions for the entire network. In addition, one or more program 440 at block 701 (FIG. 6) locating at least one virtual machine can include one or more program 440 performing one or more of blocks 701a-701m. Further, one or more program 440 at block 704 (FIG. 6) providing location information of at least one virtual machine can include one or more program 440 performing one or more of blocks 704a-704g.

FIG. 7A illustrates network communication, including communication leading to establishment of a connection between a virtual machine VM1 located on network A and a virtual machine VM6 located on network C. In the embodiment of FIG. 7A, one or more program 441 (e.g., running on network device 120-A of FIG. 5) at block 700 sends to network connectivity device 125 of FIG. 5 a request for location information of virtual machine VM6, e.g., by sending to network connectivity device 125 virtual machine identification information corresponding to virtual machine VM6. For example, gratuitous address resolution functionality of virtual machine VM6 can be inactive. In such a case, locating virtual machine VM6 cannot rely on a method for locating a virtual machine with active gratuitous address resolution functionality.

In one embodiment, one or more program 440 (e.g., running on a network connectivity device 125) at block 701a locates virtual machine VM6. In such a case, one or more program 440 at block 701a can receive an IP address (or a layer 3 network address) of virtual machine VM6 from network device 120-A. For example, one or more program 440 at block 701b checks a virtual machine registry for location information of virtual machine VM6. For example, the virtual machine registry can include an entry for each virtual machine VM1-VM6, the entry including an IP address and a MAC address of the virtual machine. In a case where the virtual machine registry does not include location information for virtual machine VM6, one or more program 440 at block 701c queries network B for virtual machine VM6.

In one embodiment, one or more program 442 (e.g., running on network device 120-B of FIG. 5) at block 702 looks for virtual machine VM6, does not find it located at network B, and responds accordingly to network connectivity device 125. (If virtual machine VM6 is found, registration proceeds at block 704a.) Next, one or more program 440 at block 701d queries network C for virtual machine VM6. In such a case, for example, one or more program 443 (e.g., running on network device 120-C of FIG. 5) at block 703 determines that virtual machine VM6 is located on network C, and responds with location information thereof to network connectivity device 125. (If virtual machine VM6 is not found, the method ends without locating virtual machine VM6.)

In one embodiment, one or more program 440 at block 704a registers virtual machine VM6 in the virtual machine registry. In addition, one or more program 440 at block 704b provides location information of virtual machine VM6, e.g., to virtual machine VM1 located on network A. In addition, one or more program 441 at block 705 receives the location information of virtual machine VM6. Further, one or more program 440 at block 704c records network C in a computing network node table. For example, the computing network node table can list all networks known to have silent virtual machines located therein.

In one embodiment, in a subsequent request for location information of virtual machine VM6, one or more program 440 at block 701b checks the virtual machine registry for location information of virtual machine VM6 and finds the location information therein, and then one or more program 440 at block 704b provides location information of virtual machine VM6, e.g., to virtual machine VM1 located on network A.

FIG. 7B illustrates network communication, including communication leading to establishment of a connection between a virtual machine VM1 located on network A and a virtual machine VM5 located on network C. Advantageously, in the embodiment of FIG. 7B, the computing network node table can be used to reduce the number of networks queried to find virtual machine VM5, allowing for reduced bandwidth consumption and faster location of virtual machine VM5.

For instance, during ongoing operation of the network described in FIG. 7B, network connectivity device 125 (FIG. 5) may have an internal forwarding table as follows:

TABLE A

| Network Connectivity Device Forwarding Table | | |
| --- | --- | --- |
| Virtual Machine MAC | Virtual Machine IP | Virtual Switch IP |
| 00:00:11:12:34:56 | 1.1.1.1 (VM1) | 10.10.10.10 (network device 120-A) |
| 00:00:11:14:F4:5A | Unknown | 20.20.20.20 (network device 120-C) |
| 00:00:11:AA:FE:76 | 1.1.1.6 (VM6) | 20.20.20.20 (network device 120-C) |

By way of explanation, in Table A above, each row includes an entry that is representative of either the virtual machine location registry, the computing network node table, or both.

For instance, the first and third rows can include virtual machine location registry information. In the example of Table A, the first row indicates that a virtual machine VM1 is registered as connected to virtual switch IP 10.10.10.10 on network device 120-A (FIG. 5.) In addition, the third row indicates that a virtual machine VM6 is registered as connected to virtual switch IP 20.20.20.20 network device 120-C (FIG. 5).

Further, the second row can include recorded computing network nodes previously found to have silent virtual machines. For example, the second row indicates that network device 120-C (FIG. 5) is recorded as having a virtual machine with an unknown IP address, e.g., a silent virtual machine.

It should be understood that in a fully operational system, hundreds, thousands, or even millions of other rows will be present in the forwarding table related to other virtual networks and other virtual machines. In another embodiment, instead of a single forwarding table, a first table may be used to track virtual machine location information, and a second table may be used to track networks known to have silent virtual machines.

Continuing again with the embodiment of FIG. 7B, one or more program 441 at block 706 sends to network connectivity device 125 a request for location information of virtual machine VM5, e.g., by sending to network connectivity device 125 virtual machine identification information corresponding to virtual machine VM5. In one embodiment, one or more program 440 at block 701e receives an IP address of virtual machine VM5 from network device 120-A and locates virtual machine VM5. For example, one or more program 440 at block 701f checks a virtual machine registry for location information of virtual machine VM5. In a case where the virtual machine registry does not include location information for virtual machine VM5, one or more program 440 at block 701g selects network device 120-C (i.e., the network corresponding to network device 120-C of FIG. 5) from the computing network node table, because network device 120-C is a silent virtual machine network device i.e., a network device known to be network connected to at least one silent virtual machine, because the second row of Table A shows that network device 120-C hosts a silent virtual machine having a known MAC address and an unknown IP address. (If virtual machine VM5 is found, the method can proceed to step 704b (see FIG. 7A).)

Next, one or more program 440 at block 701h queries network C for virtual machine VM5, for example, by sending the IP address of virtual machine VM5 to network device 120-C. In such a case, for example, one or more program 443 at block 707 determines that virtual machine VM5 is located on network C, and responds with location information thereof to network connectivity device 125. For example, in the embodiment described in Table B, one or more program 443 at block 707 responds to network connectivity device 125 with the MAC address of the silent virtual machine of row 2 of Table A, which is the same MAC address of virtual machine VM5, and the silent virtual machine of row 2 is virtual machine VM5. In another example, if virtual machine VM5 cannot be found, the method may end. In another example, one or more program 443 can respond to network connectivity device 125 with a different MAC address, not present in Table A, and a new row would be added to Table A. Such a situation could arise because, for example, a network administrator has configured virtual machines on network C to be silent virtual machines, and row 2 of Table A provides an indication of such a configuration. In such a manner, the technique described herein can allow silent virtual machine network devices to be queried before network devices that are not previously indicated to host silent virtual machines. Advantageously, this can allow for optimized querying because some networks may never need to be queried, as they simply may not host silent virtual machines.

In one embodiment, one or more program 440 at block 704d registers virtual machine VM5 in the virtual machine registry. In addition, one or more program 440 at block 704e provides location information of virtual machine VM5, e.g., to virtual machine VM1 located on network A. In addition, one or more program 441 at block 708 receives the location information of virtual machine VM5.

In one embodiment, one or more program 440 at block 701h can query multiple networks recorded in the computing node network table until one network responds with location information of virtual machine VM5.

By way of example, after the process described above, the network connectivity device forwarding table can be updated to include the new information, including the location of virtual machine VM5.

TABLE B

Network Connectivity Device Forwarding Table

| Virtual Machine MAC | Virtual Machine IP | Virtual Switch IP |
|---|---|---|
| 00:00:11:12:34:56 | 1.1.1.1 (VM1) | 10.10.10.10 (network device 120-A) |
| 00:00:11:14:F4:5A | 1.1.1.5 (VM5) | 20.20.20.20 (network device 120-C) |
| 00:00:11:AA:FE:76 | 1.1.1.6 (VM6) | 20.20.20.20 (network device 120-C) |

TABLE C

Network Connectivity Device Forwarding Table

| Virtual Machine MAC | Virtual Machine IP | Virtual Switch IP |
|---|---|---|
| 00:00:11:12:34:56 | 1.1.1.1 (VM1) | 10.10.10.10 (network device 120-A) |
| 00:00:11:14:F4:5A | 1.1.1.5 (VM5) | 20.20.20.20 (network device 120-C) |
| 00:00:11:AA:FE:76 | 1.1.1.6 (VM6) | 20.20.20.20 (network device 120-C) |
| 00:00:11:23:45:67 | 1.1.1.3 (VM3) | 30.30.30.30 (network device 120-B) |

FIG. 7C illustrates network communication, including communication leading to establishment of a connection between a virtual machine VM1 located on network A and a virtual machine VM3 located on network B. Advantageously, in the embodiment of FIG. 7C, for example, a pre-determined timeout interval can be used so that the required silent virtual machine can be found notwithstanding certain networks not reporting back to the network connectivity device 125 of FIG. 5 in a timely manner.

For instance, one or more program 441 at block 709 sends to network device 125 a request for location information of virtual machine VM3, e.g., by sending to network device 125 virtual machine identification information corresponding to virtual machine VM3. In one embodiment, one or more program 440 at block 701*i* locates virtual machine VM3. For example, one or more program 440 at block 701*j* checks a virtual machine registry for location information of virtual machine VM3. If virtual machine VM3 is in the registry, the method can proceed to blocks 704*b*-704*c* (see FIG. 7A). In one embodiment, one or more program 440 at block 701*k* queries, for a pre-determined timeout interval, network C for virtual machine VM3. In such a case, for example, one or more program 443 at block 710 may begin determining if virtual machine VM3 is located on network C, but may not immediately respond to network connectivity device 125. For example, by using a pre-determined timeout interval, the locating process can be optimized to wait an appropriate length of time for a response, and the queried network device can be configured to simply not respond if the silent virtual machine is not connected to the network device, thereby saving bandwidth.

In one embodiment, one or more program 440 at block 701*l* waits for the pre-determined time interval to end. Next, one or more program 440 at block 701*m* queries network B for virtual machine VM3. In such a case, for example, one or more program 442 at block 711 determines that virtual machine VM3 is located on network B, and responds with location information thereof to network connectivity device 125. If virtual machine VM3 is not located on network B, the method can end at this point.

In one embodiment, one or more program 440 at block 704*f* registers virtual machine VM3 in the virtual machine registry. In addition, one or more program 440 at block 704*g* provides location information of virtual machine VM3, e.g., to virtual machine VM1 located on network A. In addition, one or more program 441 at block 712 receives the location information of virtual machine VM3.

By way of example, after the process described above, the network connectivity device forwarding table can be updated to include the new information, including the location of virtual machine VM5.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:

locating, by one or more processor, at least one virtual machine within a virtual network, wherein gratuitous address resolution functionality of the at least one virtual machine is inactive, wherein the locating includes receiving an IP address of the at least one virtual machine, selecting a silent virtual machine network device from a computing network node table, wherein the computing network node table comprises at least one network connection record of the silent virtual machine network device hosting a silent virtual machine having a known media access control (MAC) address and an unknown IP address, and querying the silent virtual machine network device for a MAC address corresponding to the IP address of the at least one virtual machine; and
providing, by the one or more processor, location information of the at least one virtual machine.

2. The method of claim 1, wherein the known MAC address of the silent virtual machine and the MAC address of the at least one virtual machine are the same MAC address, and the silent virtual machine and the at least one virtual machine are the same virtual machine.

3. The method of claim 2, wherein the known MAC address of the silent virtual machine and the MAC address of the at least one virtual machine are different MAC addresses, and the silent virtual machine and the at least one virtual machine are different virtual machines.

4. The method of claim 2, wherein the querying ends after a pre-determined timeout interval, and the locating further comprises:
selecting a network device from the computing network node table, wherein the computing network node table does not indicate the network device is connected to any silent virtual machine; and
querying the network device for a MAC address corresponding to the IP address of the at least one virtual machine.

5. The method of claim 2, wherein the locating further comprises receiving, from the at least one silent virtual machine network device, the MAC address corresponding to the IP address of the at least one virtual machine.

6. The method of claim 1, wherein the locating comprises:
finding a media access control (MAC) address corresponding to the IP address of the at least one virtual machine.

7. The method of claim 6, wherein the providing comprises registering the found MAC address corresponding to the received IP address of the at least one virtual machine in a virtual machine registry.

8. The method of claim 6, wherein the locating comprises checking a virtual machine registry for the MAC address corresponding to the received IP address of the at least one virtual machine.

9. The method of claim 1, wherein the locating comprises using a layer 3 network address of the at least one virtual machine to locate a network device having a layer 2 network connection to the at least one virtual machine.

10. The method of claim 1, wherein the method further comprises deactivating the gratuitous address resolution functionality of the at least one virtual machine.

11. A computer program product comprising:
a computer readable storage medium readable by one or more processor and storing instructions for execution by the one or more processor for performing a method comprising:
locating, by one or more processor, at least one virtual machine within a virtual network, wherein gratuitous address resolution functionality of the at least one virtual machine is inactive, wherein the locating includes receiving an IP address of the at least one virtual machine, selecting a virtual machine hosting network device from a computing network node table, wherein the computing network node table comprises at least one network connection record of the silent virtual machine network device hosting a silent virtual machine having a known media access control (MAC) address and an unknown IP address, and querying the silent virtual machine network device for a MAC address corresponding to the IP address of the at least one virtual machine; and
providing, by the one or more processor, location information of the at least one virtual machine.

12. The computer program product of claim 11, wherein the locating comprises:
receiving an IP address of the at least one virtual machine; and
finding a MAC address corresponding to the IP address of the at least one virtual machine.

13. The computer program product of claim 11, wherein the locating comprises using a layer 3 network address of the at least one virtual machine to locate a network device having a layer 2 network connection to the at least one virtual machine.

14. The computer program product of claim 11, wherein the method further comprises deactivating the gratuitous address resolution functionality of the at least one virtual machine.

15. A system comprising:
a memory;
one or more processor in communication with the memory; and
program instructions executable by the one or more processor via the memory to perform a method, the method comprising:
locating, by one or more processor, at least one virtual machine within a virtual network, wherein gratuitous address resolution functionality of the at least one virtual machine is inactive, wherein the locating includes receiving an IP address of the at least one virtual machine, selecting a virtual machine hosting network device from a computing network node table, wherein the computing network node table comprises at least one network connection record of the silent virtual machine network device hosting a silent virtual machine having a known media access control (MAC) address and an unknown IP address, and querying the silent virtual machine network device for a MAC address corresponding to the IP address of the at least one virtual machine; and
providing, by the one or more processor, location information of the at least one virtual machine.

16. The system of claim 15, wherein the locating comprises:
finding a media access control (MAC) address corresponding to the IP address of the at least one virtual machine.

17. The system of claim 15, wherein the locating comprises using a layer 3 network address of the at least one virtual machine to locate a network device having a layer 2 network connection to the at least one virtual machine.

* * * * *